June 14, 1927.

Re. 16,650

H. H. HOUGHTON

VALVED COUPLING FOR LUBRICATORS

Original Filed Jan. 17, 1920

Inventor,
Herbert H. Houghton.

By Robert Weston

Attorney

Reissued June 14, 1927.

Re. 16,650

UNITED STATES PATENT OFFICE.

HERBERT H. HOUGHTON, OF LOS ANGELES, CALIFORNIA, ASSIGNOR, BY MESNE ASSIGNMENTS, TO THE BASSICK MANUFACTURING COMPANY, OF CHICAGO, ILLINOIS, A CORPORATION OF DELAWARE.

VALVED COUPLING FOR LUBRICATORS.

Original No. 1,342,678, dated June 8, 1920, Serial No. 351,984, filed January 17, 1920. Application for reissue filed December 17, 1923. Serial No. 681,307.

My invention relates primarily to that class of devices which are intended to be used in connection with the filling or charging of grease cups for automobiles and other machinery wherein the lubricant is supplied under pressure to the end that proper lubrication of the bearing will be insured.

One object of my invention is to provide means whereby the pressure on the supply of lubricant may be maintained whether the connection to the grease cup is established for the transfer of lubricant or whether the device is disconnected from the grease cup.

Another object of my invention is the provision of means for sealing the joint between the grease cup and the supplying connection to the end that all of the lubricant handled by the device will be maintained either in the device or transferred to the grease cup without loss by leakage with its consequent ill effects both to the hands and apparel of the user and to the appearance of the machine.

Another object of my invention is the provision of a structure which may be used directly upon a compression grease gun or upon the end of a flexible or other lubricant conduit.

Other objects of my invention will appear and be described in the specification.

The novelty of my invention will be hereinafter more fully set forth and specifically pointed out in the claims.

In the accompanying drawing.

The same numerals of reference are used to indicate identical parts in all the figures.

Figure 1:
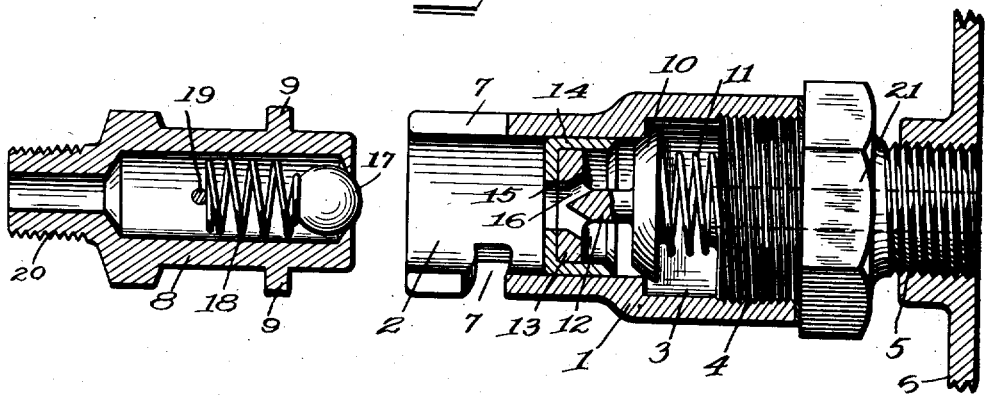
Figure 1 is a sectional elevation of a device embodying my invention adjacent to a grease cup adapted to be supplied with lubricant.

For the purpose of illustration to show one form of mechanism in which my invention may be embodied, I have shown a member which I will call a connection and designate by the numeral 1. This connection comprises a cylindrical portion 2 and a second larger cylindrical portion 3 which is threaded to receive the end of a plug 4, the other end of which as shown at 5 is adapted to be either connected to the head 6 of an ordinary compression grease gun, or compressor, or to any other form of lubricant supplying conduit. The cylindrical portion 2 of the connection 1 is provided with cam acting slots 7 which are somewhat in the form of a bayonet joint by means of which the connection 1 may be secured to any suitable grease cup 8 or nipple which is provided with lugs 9 which co-act with the slots 7 for purposes to be presently described.

A valve 10 is mounted at the juncture of the portions 2 and 3 of the connection 1 and is normally held upon its seat by any suitable spring 11, the valve carrying an extension 12 which carries a head 13 upon which a cup leather 14 is mounted, the cup leather fitting within the bore of the cylindrical portion 2. The cup leather 14 has a central opening 15 and communicates with lubricant passages 16 which extend through the head 13.

Figure 2:
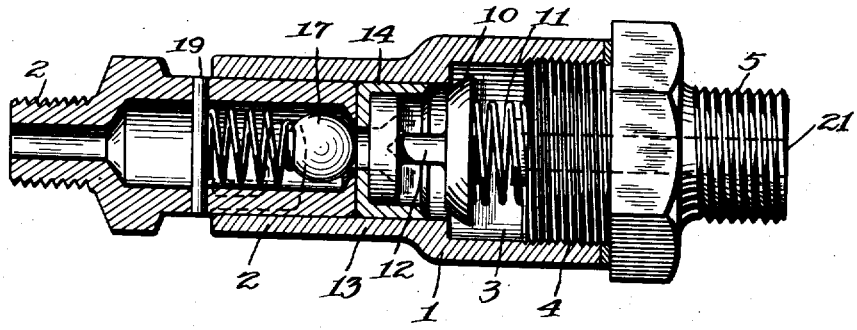
Fig. 2 is a sectional elevation of the parts shown in Fig. 1, the supplying connection being shown engaged with the grease cup or lubricant receiving member and the lubricant transfer passages opened.

The grease cup 8 is preferably provided with a ball check valve 17, held to its seat by a spring 18 which bears against the pin 19, the construction being such that the ball valve 17 may be opened, as shown in Fig. 2, by the pressure of the lubricant which is forced into the grease cup, the opposite end of the grease cup being threaded as at 20 to serve as a means for attachment to the machinery which it is desired to lubricate.

The operation of the device is as follows, assuming the parts to be in the position shown in Fig. 1 and assuming that lubricant under pressure is supplied to the portion 3 of connection 1 through any suitable conduit 21 in the plug 4, and also assuming that the grease cup is attached to a bearing or other part of machinery which it is desired to lubricate. By placing the connection 1 over the grease cup 8 and causing the lugs 9 to enter the slots 7, the parts may be brought nearly to the position shown in Fig. 2 whereupon by turning the connection 1 with relation to the grease cup 8, the cam portions of the slots 7 become effective to force the cup leather 14 against the end of the grease cup to first seal the joint between the connection and the grease cup and then move the valve 10 from its seat whereupon the pressure upon the lubricant causes a flow past the valve 10 through the passage 16 and opening 15, forcing the ball valve 17 from its seat and transferring a quantity of lubricant to the cup 8, the relative positions of the parts just described is such that when the lugs 9 begin to enter the cam portion of the slots 7, the end of the grease cup or lubricant receiving member 8 just comes in contact with the cup leather 14, and that when the connection 1 is turned to cause the lugs to travel in the cam portion of the slots 7, sufficient movement between the parts is produced to force the cup leather and the parts which carry it as well as the valve 10 toward the plug 4 thus raising the valve from its seat as shown in Fig. 2.

It is to be observed that the pressure of the lubricant as it fills the space between the discharge side of the valve 10 and the end of the receiving member 8 becomes effective on the inner diameter of the cylindrical portion of the cup leather 14 to expand the leather and cause it to seal the passage through the device against leakage at the outer wall of the cylindrical portion 2, and also that the face of the cup leather acts as a seal for the joint between the end of the lubricant receiving member 8 and the lubricant passage so that all of the lubricant which passes through the device is forced to enter the lubricant receiving member, the outside of the lubricant receiving member and the inside of the cylindrical portion 2 of the connection 1 which embraces the lubricant receiving member are maintained dry and free from lubricant, the only exposed portion upon which any of the transferred lubricant may remain being that portion of the ball check valve 17 which projects from the member 8 when the ball valve is seated.

To stop the flow of the lubricant through the device it is only necessary to reverse the previously described method of connecting the parts together, whereupon the valve 10 will become seated and the ball check valve 17 will also be forced to its seat.

It is to be observed that the pressure exerted upon the supply of lubricant may be maintained without danger of the loss of any of the lubricant with the result that the operator may connect or disconnect the device from the lubricant receiving member without the necessity of varying the pressure on his supply of lubricant, thereby effecting a material saving in the time necessary to properly lubricate any kind of machine, such as would be consumed were it necessary to first establish the connection to the lubricant supply, then apply the pressure for the transfer, then release the pressure, and then disconnect the device.

Having thus fully described my invention, I claim:

1. In a lubricator for injecting grease or oil under relatively high pressure into machine bearings through nipples associated with said bearings, the combination of a compression grease gun, a lubricant delivery connection carried by said gun for receiving said nipples, said lubricant delivery connection comprising a sleeve adapted to receive said nipples, said sleeve and nipples having interengaging means for forming a quickly detachable connection therebetween upon relative rotation of the two to resist separation of the two by relative non-rotative movement under the pressure of the lubricant created by said gun, a gasket mounted in said sleeve and co-acting with said nipples for making fluid tight the connection between said nipples and said sleeve, a valve seat on said sleeve, an inwardly opening pressure retaining valve on said seat, and means forming a valve stem projecting through said seat and cooperating with said nipples for opening said valve when said nipples and sleeve are moved relatively to each other.

2. In a lubricator for injecting grease or oil under relatively high pressure into machine bearings through nipples associated with said bearings, the combination of a compression grease gun, a lubricant delivery connection carried by said gun for receiving said nipples, said lubricant delivery connection comprising a sleeve adapted to receive said nipples, a gasket slidingly mounted in said sleeve and adapted to be pressed against the end of said nipples, a valve seat on said sleeve, a valve co-acting with said seat, means including a stem for causing said gasket and seat to move relatively towards each other and thereby cause relative motion between said valve and seat, and means affording a conduit for said lubricant from said valve seat through said gasket to the forward side of the latter.

3. In a lubricator for injecting grease or oil under relatively high pressure into machine bearings through nipples associated with said bearings, the combination of a compression grease gun, a lubricant delivery connection carried by said gun for receiving said nipples, said lubricant delivery connection comprising a sleeve adapted to receive said nipples, a gasket slidingly mounted in said sleeve and adapted to be pressed against the end of said nipples, a valve and valve seat therefor carried by said sleeve, said valve and seat being located rearwardly of said nipples when the ends of the latter are pressed against said gasket, means for causing relative motion between said gasket and valve seat for opening said valve, and means providing a conduit for said lubricant from said valve seat through said gasket to the forward side of the latter.

4. In a lubricator for injecting grease or oil under relatively high pressure into machine bearings through nipples associated with said bearings, the combination of a compression grease gun, a lubricant delivery connection carried by said gun for receiving said nipples, a pressure retaining valve in said connection, means cooperating between said connection and said nipples whereby said connection may be attached to said nipples to resist separation of the two by relative non-rotative movement under the pressure of the lubricant created by said gun, and means cooperating between said valve and said nipples whereby when said connection is attached to said nipples said valve will be opened to permit the passage of lubricant into the nipple, said last named means comprising a grease pressed cup washer in said connection forwardly of and in spaced relation to said valve for sealing the joint between the nipples and the connection and means including said gasket for opening said valve.

5. In a lubricator for injecting grease or oil under relatively high pressure into machine bearings through nipples associated with said bearings, the combination of a compression grease gun, a lubricant delivery connection carried by said gun for receiving said nipples, a pressure maintaining valve in said connection, means cooperating between said connection and said nipples to draw said nipples into said connection by relative rotative movement and thereafter to resist separation of the two by relative non-rotative movement under the pressure of the lubricant created by said gun, means cooperating between the end of the nipples and the pressure retaining valve for opening the latter when the connection is attached to the nipples, said last named means comprising a grease pressed cup washer in said connection forwardly of and in spaced relation to said valve for sealing the joint between the nipples and the connection and means including said gasket for opening said valve, and a check valve for retaining the lubricant in the nipples.

6. In a lubricator for injecting grease or oil under relatively high pressure into machine bearings through nipples associated with said bearings, said nipples each provided with a check valve, a pressure grease gun carrying a lubricant delivery connection adapted to receive a portion of the nipple, a pressure retaining valve in the connection, means for normally holding said valve to its seat, and means cooperating with said portion of the nipple and the valve for opening the valve in the connection, said last named means comprising a lubricant pressed gasket slidably mounted in said connection forwardly of and in spaced relation to said valve and cooperating with said portion of said nipple and said connection for sealing the joint therebetween and also comprising means for transmitting the sliding of said gasket to said valve for opening the latter.

7. In a lubricator for injecting grease or oil under relatively high pressure into machine bearings through nipples associated with said bearings, said nipples each provided with a check valve, a pressure grease gun carrying a lubricant delivery connection adapted to receive a portion of the nipple, a pressure retaining valve in the connection, means for normally holding said valve to its seat, and means cooperating with said portion of the nipple and the valve for opening the valve in the connection, said last named means comprising a grease pressed cup washer in said connection forwardly of and in spaced relation to said valve and cooperating with said portion of said nipple and the walls of said connection for sealing the joint between said receiving member and connection and also comprising means for transmitting the sliding of said gasket to said valve for opening the latter.

In testimony that I claim the foregoing as my own, I have hereto affixed my signature.

HERBERT H. HOUGHTON.